F. N. LEPHART.
FENDER.
APPLICATION FILED APR. 6, 1911.
1,023,083.
Patented Apr. 9, 1912.
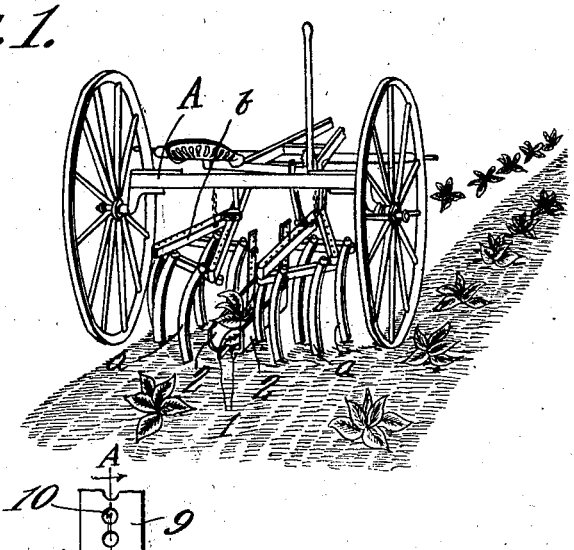
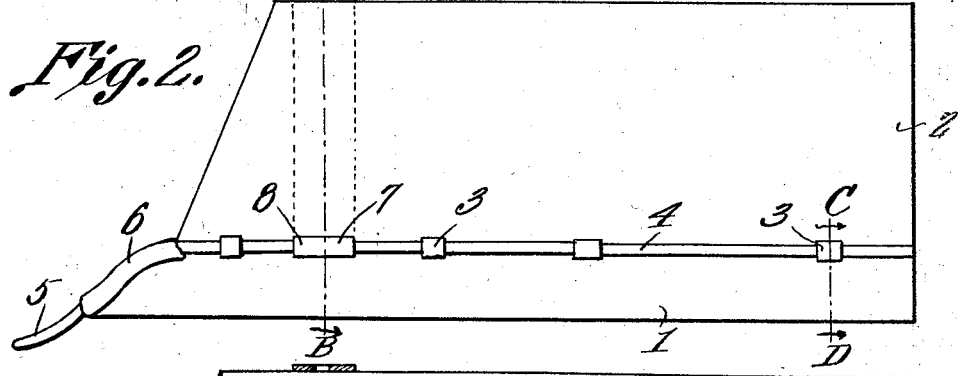
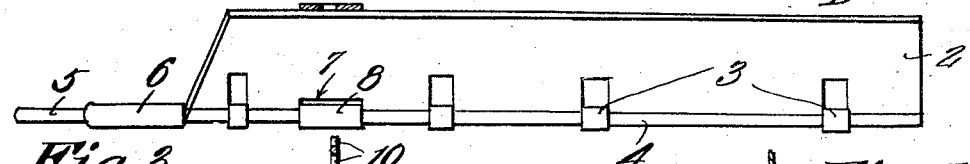
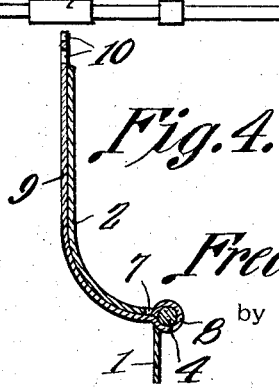
Witnesses
Frederick N. Lephart, Inventor
by C. A. Snow & Co.
Attorneys

UNITED STATES PATENT OFFICE.

FREDERICK N. LEPHART, OF ANSONIA, OHIO.

FENDER.

1,023,083.   Specification of Letters Patent.   Patented Apr. 9, 1912.

Application filed April 6, 1911. Serial No. 619,354.

*To all whom it may concern:*

Be it known that I, FREDERICK N. LEPHART, a citizen of the United States, residing at Ansonia, in the county of Darke and State of Ohio, have invented a new and useful Fender, of which the following is a specification.

This invention relates to fenders for use in connection with cultivators and is particularly designed for use in the cultivation of tobacco. Fenders as heretofore employed for this purpose have been objectionable because they tend to cut or otherwise injure the leaves of the plants.

The principal object of the present invention is to provide a fender which will work under the leaves and lift them out of the path of the fender so that they will not be mutilated. Moreover the fender is so constructed as to permit fine earth to sift thereunder and against the stems of the plants, thus covering the surface close to the plants and preventing weeds from growing.

With the foregoing and other objects in view which will appear as the description proceeds the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings, the preferred form of the invention has been shown.

In said drawings:—Figure 1 is a perspective view of a cultivator having the present improvements applied thereto. Fig. 2 is an enlarged side elevation of one of the fenders. Fig. 3 is a plan view thereof. Fig. 4 is a section on line A—B Fig. 2. Fig. 5 is a section on line C—D Fig. 2.

Referring to the figures by characters of reference A designates a riding harrow which can be of any type desired and in the form shown the cultivator teeth *a* are arranged in two groups depending from harrow frames *b*. The fenders constituting the present invention are adapted to be arranged parallel to each other and between these groups of harrow teeth and each fender consists of a straight runner 1 formed along the lower edge of a curved guard plate 2, said guard plate extending laterally and upwardly and having its forward end inclined downwardly and forwardly toward the runner. Eyes 3 are struck inwardly from the guard plate along the shoulder formed where the plate merges into the runner and these eyes embrace a rod 4 which extends longitudinally along the upper edge of the runner and is inclined downwardly and forwardly along the front edge of said runner and terminates in a finger 5 projecting below the lower edge of the runner but in advance thereof. The front end portion of the runner is wrapped about that portion of the rod adjacent thereto as shown at 6 and this wrapping portion, together with the eyes 3, serves to hold the rod in fixed relation to the runner.

An opening 7 is formed in the upper portion of the runner adjacent the front end thereof and receives an eye 8 formed at the lower end of a standard 9, this standard being welded or otherwise attached to the guard plate 2 and projecting upwardly any desired distance above said plate, the projecting portion of the standard being formed with a longitudinal series of apertures 10 for the reception of attaching means whereby said standard may be fixedly connected to one of the harrow frames *b*.

Two fenders such as have been described are to be employed, one of them being a "left" and the other a "right", the fenders being arranged with their guard plates diverging upwardly and then extending substantially parallel to each other.

After the parts have been properly adjusted the cultivator can be drawn forward in the usual manner, the fenders moving along opposite sides of the row of plants. The lower edges of the fenders are supported above the surface of the ground but the forwardly projecting fingers 5 plow into the ground, thus forming shallow furrows at the sides of the row. The upstanding portions of the fenders prevent the loose soil from being thrown onto the plants but portions of the soil are free to sift under the fenders and around the roots of the plants, this fine soil piling on any small weeds and serving to prevent the growth thereof. The fingers 5, by reason of their peculiar shape and positions move under the leaves of the plants and gradually lift them onto the longitudinal leaf supporting shelves formed by the upper or concave faces of the plates 2, it thus being possible for the fenders to run close to the plants without cutting or otherwise injuring the leaves.

It will be noted that by extending the rod 4 longitudinally along the shelves it serves to reinforce the fender longitudinally.

What is claimed is:—

1. A fender for cultivators including a plate the lower portion of which constitutes a straight runner, the upper portion of the plate being bent abruptly to one side from the runner to constitute a leaf supporting shelf which merges into an upwardly extending guard, and a lifting finger extending along the front edge of the runner and downwardly and forwardly therefrom to a point below the runner.

2. A fender for cultivators including a plate the lower portion of which constitutes a straight runner, the upper portion of the plate being bent abruptly to one side from the runner to constitute a leaf supporting shelf which merges into an upwardly extending guard, and a lifting finger extending along the front edge of the runner and downwardly and forwardly therefrom to a point below the runner, said finger merging into a reinforcing rod extending longitudinally along the angle formed by the shelf and runner.

In testimony that I claim the foregoing as my own, I have hereto affixed my signature in the presence of two witnesses.

FREDERICK N. LEPHART.

Witnesses:
H. A. CLAUSON,
H. WESTFALL.